United States Patent [19]
Grab et al.

[11] Patent Number: 5,732,848
[45] Date of Patent: Mar. 31, 1998

[54] DISPOSABLE AND RETURNABLE CONTAINERS COMPRISING AN INSERT

[75] Inventors: Hans Grab, Neidenstein; Siegbert Papzien, Niederkruechten, both of Germany

[73] Assignee: Teroson GmbH, Heildelberg, Germany

[21] Appl. No.: 433,371

[22] PCT Filed: Oct. 28, 1993

[86] PCT No.: PCT/EP93/02992

§ 371 Date: Nov. 2, 1995

§ 102(e) Date: Nov. 2, 1995

[87] PCT Pub. No.: WO94/11271

PCT Pub. Date: May 26, 1994

[30] Foreign Application Priority Data

Nov. 6, 1992 [DE] Germany .................. 92 15 129 U

[51] Int. Cl.$^6$ ................................................. B65D 88/00
[52] U.S. Cl. ........................................ 220/578; 222/386
[58] Field of Search ................................. 220/578, 470; 222/386

[56] References Cited

U.S. PATENT DOCUMENTS

| | | | |
|---|---|---|---|
| 2,465,755 | 3/1949 | Sanders | 220/578 X |
| 5,305,909 | 4/1994 | Merritt | 220/578 X |

FOREIGN PATENT DOCUMENTS

| | | |
|---|---|---|
| 0102484 | 3/1984 | European Pat. Off. . |
| 0319861 | 6/1989 | European Pat. Off. . |
| 0363307 | 4/1990 | European Pat. Off. . |
| 0408515 | 1/1991 | European Pat. Off. . |
| 0413049 | 2/1991 | European Pat. Off. . |
| 0600732 | 2/1926 | France . |
| 2918707 | 5/1979 | Germany . |
| 8812012 | 12/1988 | Germany . |

*Primary Examiner*—Steven M. Pollard
*Attorney, Agent, or Firm*—Ernest G. Szoke; Wayne C. Jaeschke; Real J. Grandmaison

[57] ABSTRACT

A container for storing adhesive and sealant materials comprising (a) a container having a closed bottom end and an open top end, (b) an insert in the form of a disk interposed between the closed bottom end of the container and the adhesive and sealant materials contained in the container, the disk having a diameter slightly smaller than that of the container, and (c) a sheath superimposed over one face of the disk to provide overlapping perimeter edges which are folded onto an exposed face of the disk.

20 Claims, 1 Drawing Sheet

DISPOSABLE AND RETURNABLE CONTAINERS COMPRISING AN INSERT

BACKGROUND OF THE INVENTION

1. Field of the Invention

This invention relates to disposable and returnable containers comprising an insert at their base.

Adhesives and sealants for industrial consumers are supplied in drums or similar large-volume containers which are generally made of metal. In view of increasingly more stringent environmental requirements, packs of the type in question now have to be completely or at least partly reuseable. Drums and similar metal containers are generally used as returnable containers, i.e. after emptying, they are cleaned and reconditioned so that they can be reused for the same or similar purposes. Disposable Containers are generally recycled. Both cases presuppose that the containers can be emptied as completely as possible. However, with paste-like or highly viscous materials, such as adhesives and/or sealants, this is often very difficult to achieve. Normally, adhesives or sealants are emptied by the end user with the aid of pumps, so-called pressure follower plates. These follower plates force the adhesives from the drums under high pressure. To this end, it is absolutely essential that the follower plate adapts itself exactly to the internal diameter of the drum at the periphery of the cylindrical part of the drum. This normally ensures that the vertical walls are left relatively clean after emptying. However, a critical area is the base of the drum where considerable residues of material remain after normal emptying.

2. Discussion of Related Art

To overcome these difficulties, the adhesives and/or sealants are introduced into so-called liner bags which in turn are placed in the drum before filling. Examples of this can be found in DE-A-29 18 707 and in EP-A-0 102 484. For moisture-sensitive materials, bags of multilayer composite films have also been proposed as drum liners, cf. for example DE-U-88 12 012.

However, in the case of very thick-flowing, highly viscous adhesive/sealant formulations, drum liners such as these generally cause difficulties because the liner material gets into the delivery zone of the tube and thus leads to difficulties in the transport of the adhesive. This occurs in particular when very thin-walled bags or drum liners have to be used for reasons of cost. In the case of adhesives with very little, if any, sensitivity to atmospheric moisture or atmospheric oxygen, it is desirable to avoid the use of drum liners because they complicate the filling process and hence, in addition to the material costs of the liner, cause further filling costs and waste disposal costs.

The problem addressed by the present invention was further to develop disposable and returnable containers in such a way that, after emptying of the containers by conventional pumps comprising pressure follower plates, only minimal residues of the adhesive/sealant remain in the drums so that there is largely no need for additional cleaning measures after the drums have been emptied.

BRIEF DESCRIPTION OF THE DRAWINGS

According to the invention, this problem has been solved particularly easily by the introduction of an insert in the disposable or returnable container before the filling process. One example of embodiment of the invention is described in detail in the following with reference to the accompanying drawings, wherein.

DESCRIPTION OF THE INVENTION

The insert 8 preferably consists of a circular disc 4 adapted to the internal diameter of the container 6, the diameter of the disc 4 generally being between 0.5 and 2 mm smaller than the internal diameter of the container. The disc 4 has a thickness of 0.1 to 4 mm and preferably a thickness of 1 to 3 mm and consists of a recyclable material, preferably cardboard or polyethylene or polypropylene.

Figure 1:
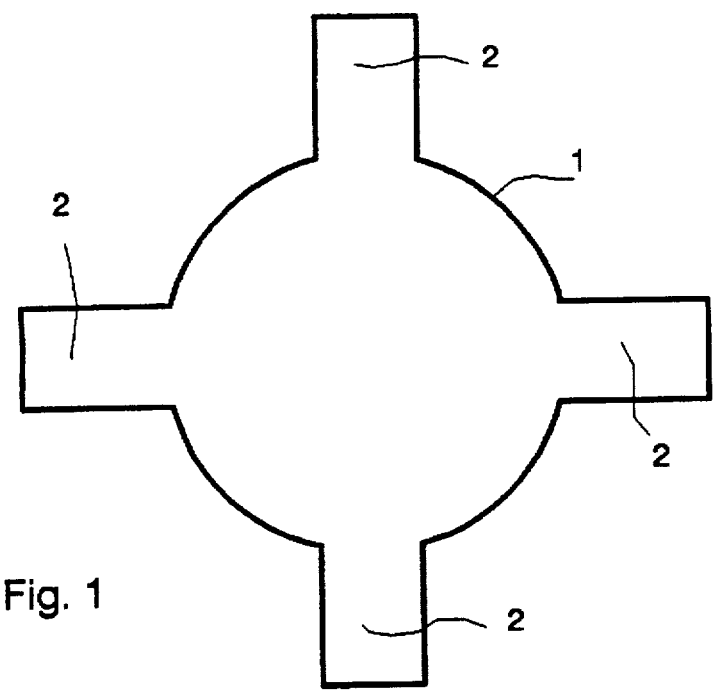
FIG. 1 is a plan view of a sheath 1.

The disc 4 is partly sheathed in a sheath 1. This sheath is either circular with a larger diameter than the disc 4 and preferably comprises one or more projecting flaps 2, as shown in FIG. 1. The sheath may consist of coated or uncoated paper, polyolefins, particularly polyethylene or polypropylene, or other plastics. Aluminium foils or composite aluminium/plastic films are also suitable. The thickness of the sheath (or foil) should be between 0.05 and 1 mm and is preferably between 0.1 and 0.5 mm. The film may optionally be coated on one side with an anti-adhesion layer consisting of a coating of polyfluoro-olefins, such as polytetrafluoroethylene for example, silicone polymers or polyolefins or wax.

Figure 2:
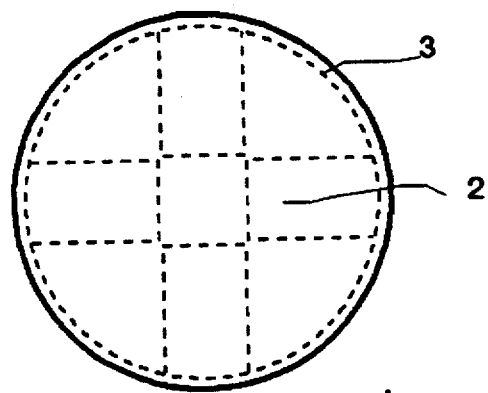
FIG. 2 is a plan view showing the complete insert 8 consisting of a circular disc 4 and the sheath 1 with folding flaps 2 and margins 3.

Those parts 3 which project beyond the diameter of the disc 4 and the projecting flaps 2 of the sheath 1 are folded back onto the underneath of the disc 4, as shown in FIG. 2, and optionally fixed thereto. Fixing may be carried out by any measures known per se, i.e. by mechanical fixing or by glueing with a contact adhesive, a hotmelt or similar measures.

Figure 3:
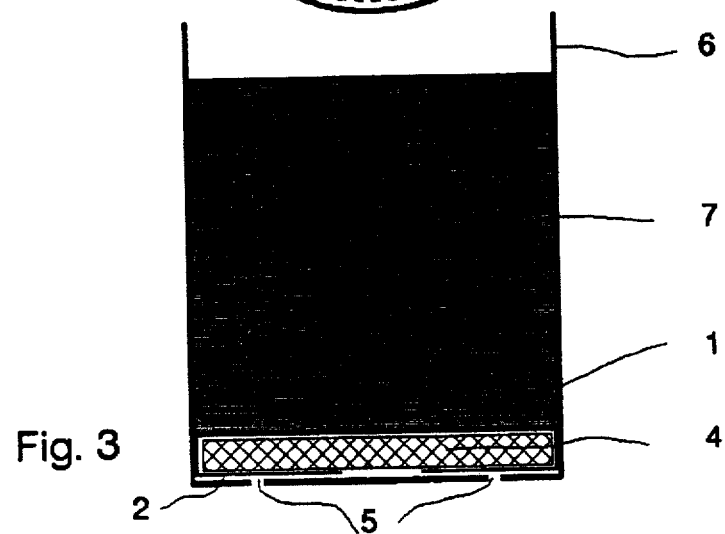
FIG. 3 shows the container 6 filled with the adhesive 7 with the insert 8 consisting of the sheath 1 and the disc 4.

The insert 8 thus prepared, consisting of the sheath 1 and the disc 4, is placed on the bottom of the disposable or returnable container 6, as shown in FIG. 3, after which the container is filled with the adhesive/sealant 7 in the usual way.

The end user of the adhesive/sealant can empty the container 6 in the usual way. When the container is changed, the insert 8 separates from the base of the container, thus preventing soiling of the base with residues of the adhesive/sealant. After the pressure follower plate has been raised from the container, considerable residues of adhesive normally adhere to the underneath of the follower plate. Now it is the insert 8 which adheres to the plate and can be separated very easily from the layer of adhesive by means of the flaps 2. The pressure follower plate can then be introduced into another container without any further measures.

In many cases, the disc 4 is soiled so lightly that it can be reused after cleaning, leaving only the sheath to be disposed of.

It has surprisingly been found that, through these simple measures, disposable containers can be disposed of or recycled with considerably less effort. In the case of returnable containers, the effort involved in the cleaning required for refilling is reduced to a minimum.

In one particular embodiment of the invention, vent holes 5 are provided in the base of the container 6 to make the pressure follower plate of the feed pump (not shown) easier to remove because a reduced pressure is avoided between the base of the container 6 and the follower plate.

Accordingly, the present invention provides a disposable and/or returnable container 6 with an insert 8 which facilitates the handling of paste-like and/or highly viscous adhesives/sealants 7 in a particularly inexpensive manner and, at the same time, meets environmental requirements.

We claim:

1. A container for storing adhesive and sealant materials comprising:

(a) a container having a closed bottom end and an open top end, (b) a removable insert comprising a circular disk and a sheath interposed between said closed bottom end of said container and said adhesive and sealant materials contained in said container, said insert having a diameter slightly smaller than the internal diameter of said container, wherein said sheath is superimposed over one face of said disk and has diameter larger than that of said disk, said sheath further having projecting generally rectangular flaps extending from the perimeter of said sheath which are folded onto an exposed face of disk.

2. The container of claim 1 wherein said insert is made of a recyclable material.

3. The container of claim 2 wherein said recyclable material is selected from the group consisting of cardboard, polyethylene, and polypropylene.

4. The container of claim 1 wherein said disk has a thickness of from 0.1 to 4 mm.

5. The container of claim 1 wherein said sheath has a thickness of from, 0.05 to 1 mm.

6. The container of claim 1 wherein said sheath is made of a material selected from the group consisting of coated paper, uncoated paper, polyethylene, polypropylene, aluminum foil, and a composite of aluminum foil and plastic film.

7. The container of claim 1 wherein said sheath is coated on one side with an anti-adhesion material selected from the group consisting of polyfluoro-olefins, silicone polymers, polyolefins and wax.

8. The container of claim 1 wherein said sheath has at least one flap projecting outwardly from said sheath and folded onto said exposed face of said disk.

9. The container of claim 8 wherein said at lease one flap is affixed onto said exposed face of said disc with means selected from the group consisting of an adhesive and a hotmelt.

10. The container of claim 1 wherein said container has holes located in said closed bottom end of said container.

11. A process for packaging adhesive and sealant materials comprising:

(a) providing a container having a closed bottom end and an open top end, (b) providing a removable insert comprising a circular disk and a sheath interposed between said closed bottom end of said container and said adhesive and sealant materials contained in said container, said insert having a diameter slightly smaller than the internal diameter of said container, wherein said sheath is superimposed over one face of said disk and has a diameter larger than that of said disk, said sheath further having projecting generally rectangular flaps extending from the perimeter of said sheath which are folded onto an exposed face of said disk, (c) inserting said insert into said container so that the face of said disk having said projecting flaps folded thereonto is adjacent to said closed bottom end of said container, and (d) introducing said adhesive and sealant materials into said container.

12. The process of claim 11 wherein said insert is made of a recyclable material.

13. The process of claim 12 wherein said recyclable material is selected from the group consisting of cardboard, polyethylene, and polypropylene.

14. The process of claim 11 wherein said disk has a thickness of from 0.1 to 4 mm.

15. The process of claim 11 wherein said sheath has a thickness of from 0.05 to 1 mm.

16. The process of claim 11 wherein said sheath is made of a material selected from the group consisting of coated paper, uncoated paper, polyethylene, polypropylene, aluminum foil, and a composite of aluminum foil and plastic film.

17. The process of claim 11 wherein said sheath is coated on one side with an anti-adhesion material selected from the group consisting of polyfluoro-olefins, silicone polymers, polyolefins and wax.

18. The process of claim 11 wherein said sheath has at least one flap projecting outwardly from said sheath and folded onto said exposed face of said disk.

19. The process of claim 18 wherein said at least one flap is affixed onto said exposed face of said disc with means selected from the group consisting of an adhesive and a hotmelt.

20. The process of claim 11 including providing holes in said closed bottom end of said container.

* * * * *